(12) United States Patent
Kee et al.

(10) Patent No.: US 9,348,369 B2
(45) Date of Patent: May 24, 2016

(54) FOLDABLE DISPLAY DEVICE

(71) Applicant: Samsung Display Co., Ltd., Yongin, Gyeonggi-Do (KR)

(72) Inventors: In-Seo Kee, Yongin (KR); So-Youn Jung, Yongin (KR); Hyoung-Wook Lee, Yongin (KR); Sang-Wol Lee, Yongin (KR)

(73) Assignee: SAMSUNG DISPLAY CO., LTD. (KR)

( * ) Notice: Subject to any disclaimer, the term of this patent is extended or adjusted under 35 U.S.C. 154(b) by 262 days.

(21) Appl. No.: 14/049,334

(22) Filed: Oct. 9, 2013

(65) Prior Publication Data

US 2014/0355195 A1    Dec. 4, 2014

(30) Foreign Application Priority Data

Jun. 3, 2013   (KR) ........................ 10-2013-0063507

(51) Int. Cl.
*G06F 1/16*    (2006.01)
*H04M 1/02*    (2006.01)

(52) U.S. Cl.
CPC ............ *G06F 1/1652* (2013.01); *G06F 1/1616* (2013.01); *G06F 1/1641* (2013.01); *H04M 1/0268* (2013.01)

(58) Field of Classification Search
CPC ........................... G06F 1/1652; H04M 1/0268
See application file for complete search history.

(56) References Cited

U.S. PATENT DOCUMENTS

| | | | | |
|---|---|---|---|---|
| 6,377,324 B1 * | 4/2002 | Katsura | ............. | G02F 1/133305 349/58 |
| 6,577,496 B1 * | 6/2003 | Gioscia | ................. | G06F 1/1616 345/156 |
| 7,379,128 B2 * | 5/2008 | Tsubokura | .......... | G06F 1/13394 349/58 |
| 7,714,801 B2 * | 5/2010 | Kimmel | ................ | G06F 1/1616 345/1.3 |
| 7,834,451 B2 * | 11/2010 | Lee | ........................ | G06F 1/1615 345/173 |
| 8,144,453 B2 * | 3/2012 | Brown | .................. | G06F 3/0414 345/173 |
| 2002/0067339 A1 * | 6/2002 | Min | ...................... | G06F 1/1601 345/156 |
| 2002/0149571 A1 * | 10/2002 | Roberts | ................. | G06F 3/0414 345/174 |
| 2002/0175836 A1 * | 11/2002 | Roberts | ................. | G06F 3/0414 341/34 |

(Continued)

FOREIGN PATENT DOCUMENTS

| | | | |
|---|---|---|---|
| KR | 1020060050636 A | | 5/2006 |
| KR | 1020100088882 A | | 8/2010 |

(Continued)

OTHER PUBLICATIONS

The Extended European Search Report for European Patent Application No. 13199087.1 dated Oct. 10, 2014.

*Primary Examiner* — Adrian S Wilson
(74) *Attorney, Agent, or Firm* — Cantor Colburn LLP

(57) ABSTRACT

A foldable display device includes a flexible display panel, a case supporting the flexible display panel, a bonding member fixing the flexible display panel to the case. The case includes a hinge portion, and supports respectively coupled to the hinge portion at opposing sides of the hinge portion. The flexible display panel includes a bendable area corresponding to the hinge portion, and planar areas respectively at opposing sides of the bendable area and corresponding to the supports of the case. The bonding member is between a support of the case and the corresponding planar area of the flexible display panel, and is displaceable with respect to the support along one of a thickness direction and a width direction of the flexible display panel when the flexible display panel is folded.

15 Claims, 11 Drawing Sheets

(56) References Cited

U.S. PATENT DOCUMENTS

| | | | | |
|---|---|---|---|---|
| 2006/0050169 A1* | 3/2006 | Misawa | ............... | G06F 1/1616 348/333.06 |
| 2006/0146488 A1* | 7/2006 | Kimmel | ............... | G06F 1/1616 361/679.04 |
| 2008/0079656 A1* | 4/2008 | Kee | ............... | G06F 1/1641 345/1.3 |
| 2009/0104949 A1* | 4/2009 | Sato | ............... | H04M 1/0214 455/575.3 |
| 2011/0148797 A1* | 6/2011 | Huitema | ............... | G06F 1/1615 345/173 |
| 2011/0227822 A1* | 9/2011 | Shai | ............... | G06F 1/1615 345/156 |
| 2012/0002360 A1* | 1/2012 | Seo | ............... | G06F 1/1616 361/679.01 |
| 2012/0033354 A1 | 2/2012 | Huang | | |
| 2012/0257368 A1* | 10/2012 | Bohn | ............... | H04M 1/022 361/809 |
| 2013/0010405 A1 | 1/2013 | Rothkopf et al. | | |

FOREIGN PATENT DOCUMENTS

| | | |
|---|---|---|
| KR | 1020120002084 A | 1/2012 |
| KR | 1020120034506 A | 4/2012 |

* cited by examiner

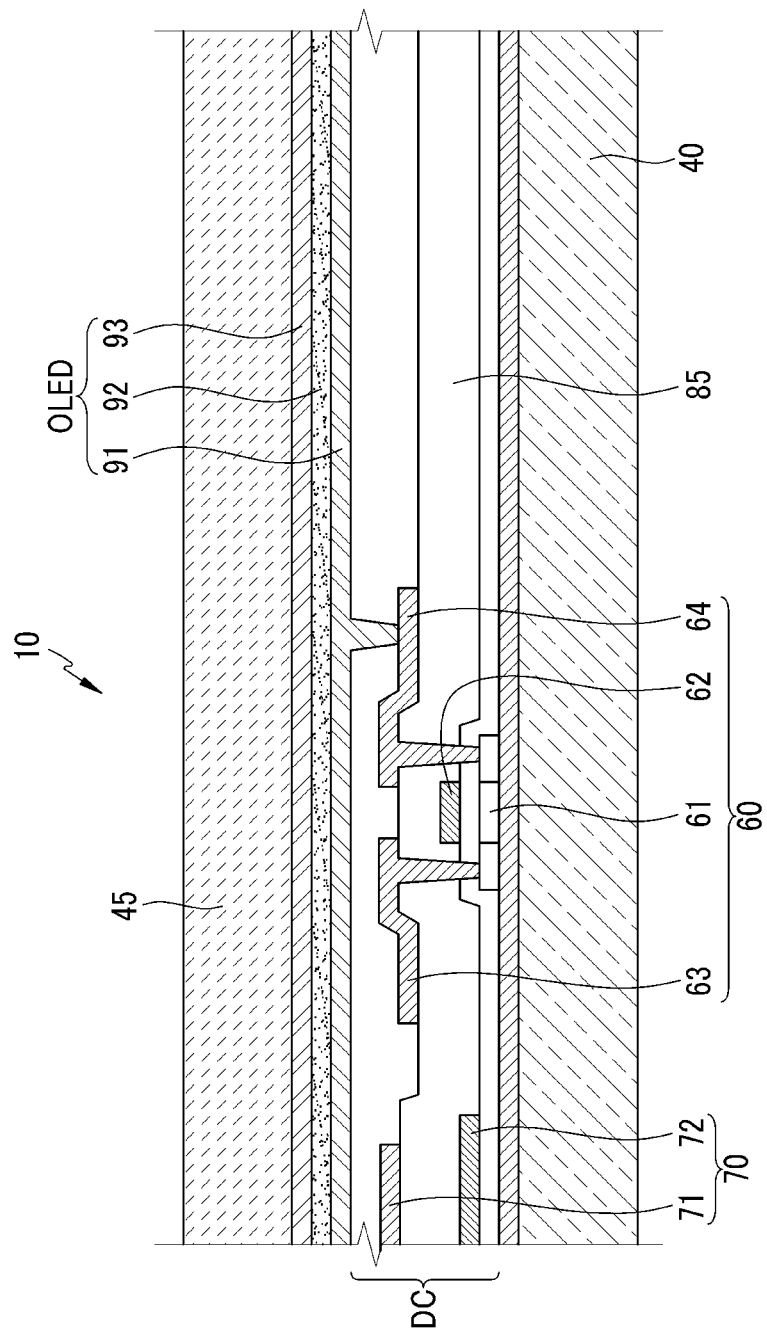

FOLDABLE DISPLAY DEVICE

This application claims priority to Korean Patent Application No. 10-2013-0063507 filed on Jun. 3, 2013, and all the benefits accruing therefrom under 35 U.S.C. §119, the entire contents of which are incorporated herein by reference.

BACKGROUND

1. Field

The invention relates generally to a foldable display device. More particularly, the invention relates generally to a method for bonding a flexible display panel and a case of a foldable display device.

2. Description of the Related Art

A foldable display device uses a bendable flexible display panel. The foldable display device can be portable when folded and can realize a large-scale screen when unfolded. As a result, the foldable display device can be applied not only to mobile equipment such as a mobile phone, an ultra-mobile personal computer ("PC"), an electronic book and the like, but also to electronic devices including, but not limited to, a television, a monitor and the like.

The foldable display device is provided with a case that supports the flexible display panel by fixing the same. The case includes a pair of supports coupled by a hinge portion, and the flexible display panel may be attached to the supports by an adhesive member, excluding a center portion thereof corresponding to the hinge portion.

SUMMARY

One or more exemplary embodiment provides a foldable display device that can suppress damage to a flexible display panel thereof by reducing a bending stress generated in the flexible display panel when the foldable display device is folded, and improve durability thereof.

A foldable display device according to an exemplary embodiment includes: a case including: a hinge portion, and supports respectively coupled to the hinge portion at opposing sides of the hinge portion; a flexible display panel including: a bendable area corresponding to the hinge portion of the case, and planar areas respectively at opposing sides of the bendable area and corresponding to the supports of the case; and a bonding member between a support of the case and the corresponding planar area, and displaceable with respect to the support along one direction among a thickness direction and a plane direction of the flexible display panel when the flexible display panel is folded.

The bonding member may include a first bonding member portion, and a second bonding member portion which is displaceable with respect to the support along the thickness direction of the flexible display panel when the flexible display panel is folded. The second bonding member portion may be closer to the hinge portion of the case than the first bonding member portion and may have a bonding force with respect to the support less than that of the first bonding member portion.

The bonding force of the second bonding member portion with respect to the support may be exceeded by an external force applied when the flexible display panel is folded, such that the second bonding member portion is separated from the support along the thickness direction of the flexible display panel when the flexible display panel is folded, and the bonding force of the second bonding member portion with respect to the support may be restored when the flexible display panel is unfolded. The second bonding member portion may include a pressure sensitive adhesive and the bonding force of the second bonding member portion with respect to the support may be in a range from about 10 gf/cm to about 1,500 gf/cm.

The first bonding member portion may include an adhesive having an elongation characteristic, and may be displaceable with respect to the support along the plane direction of the flexible display panel when the flexible display panel is folded. The first bonding member portion may include an adhesive and an elongation ratio of the first bonding member portion may be in a range from about 100% to about 1,000%. A first edge of the first bonding member portion may correspond to an external edge of the corresponding planar area, and an area of the second bonding member portion may be larger than an area of the first bonding member portion.

The bonding member may include an adhesive having an elongation characteristic, and may be displaceable with respect to the support along the plane direction of the flexible display panel when the flexible display panel is folded. An elongation ratio of the bonding member may be in a range from about 100% to about 1,000%.

A foldable display device according to another exemplary embodiment includes: a case including: a hinge portion, and supports respectively coupled to the hinge portion at opposing sides of the hinge portion; a flexible display panel including: a bendable area corresponding to the hinge portion of the case, and planar areas respectively at opposing sides of the bendable area and corresponding to the supports of the case; and a bonding member between a support of the case and the corresponding planar area, and of which, a bonding area with respect to the support is variable according to a folded state or an unfolded state of the flexible display panel.

The bonding member may include two different types of adhesives. The bonding member may include a first bonding member portion, and a second bonding member portion closer to the hinge portion of the case than the first bonding member portion and detachable from the support according to the folded state or the unfolded state of the flexible display panel.

The second bonding member portion may include a pressure sensitive adhesive, and a bonding force of the second bonding member portion with respect to the support may be in a range from about 10 gf/cm to about 1,500 gf/cm. An area of the second bonding member portion may be more than two times an area of the first bonding member portion.

BRIEF DESCRIPTION OF THE DRAWINGS

The above and other features of this disclosure will become more apparent by describing in further detail exemplary embodiments thereof with reference to the accompanying drawings, in which:

FIG. 11 is a cross-sectional view of the flexible display panel of FIG. 10, taken along line IX-IX.

DETAILED DESCRIPTION

Figure 1:
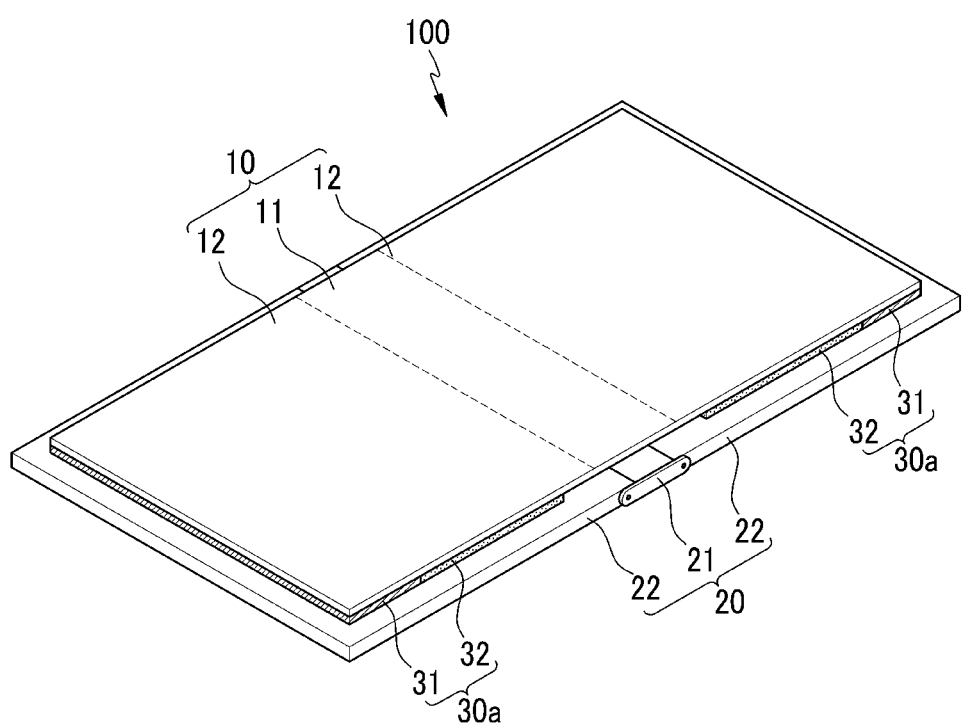
FIG. 1 is a perspective view of an exemplary embodiment of a foldable display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention. In the drawings, the size and relative sizes of layers and regions may be exaggerated for clarity.

Unless explicitly described to the contrary, the word "comprise" and variations such as "comprises" or "comprising" will be understood to imply the inclusion of stated elements but not the exclusion of any other elements. The terminology used herein is for the purpose of describing particular embodiments only and is not intended to be limiting of the invention. As used herein, the singular forms "a," "an" and "the" are intended to include the plural forms as well, unless the context clearly indicates otherwise.

Further, it will be understood that when an element such as a layer, film, region, or substrate is referred to as being "on" another element, it can be directly on the other element or intervening elements may also be present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Further, in the specification, the word "on" means positioning on or below the object portion, but does not essentially mean positioning on the upper side of the object portion based on a gravity direction.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A foldable display device is provided with a case that supports a flexible display panel by fixing the same. The case includes a pair of supports coupled by a hinge portion, and the flexible display panel may be attached to the supports by an adhesive member, excluding to a center portion thereof corresponding to the hinge portion.

When the foldable display device is folded, an inner side of a bent portion of the flexible display panel contracts by receiving a pressure from the folding, and an external side of the bent portion is extended by receiving a tension force from the folding. Since the flexible display panel is restricted by the support, a stress caused by contraction and extension cannot be released and thus remains as a bending stress. Thus, the flexible display panel may be easily damaged due to the bending stress, and accordingly, durability thereof may be deteriorated.

Hereinafter, the invention will be described in detail with reference to the accompanying drawings.

Figure 2:
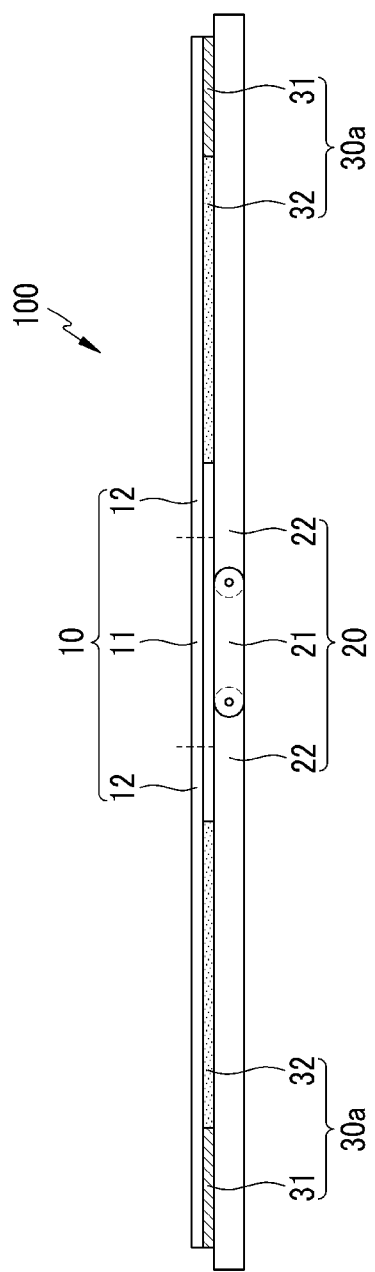
FIG. 2 is a cross-sectional view of the foldable display device of FIG. 1.

FIG. 1 is a perspective view of an exemplary embodiment of a foldable display device according to the invention and FIG. 2 is a cross-sectional view of the foldable display device of FIG. 1.

Referring to FIG. 1 and FIG. 2, a foldable display device 100 includes a flexible display panel 10, a case 20 receiving the flexible display panel 10 therein, and a bonding member 30a fixing the flexible display panel 10 to the case 20. The bonding member 30a may have predetermined viscosity, and where the bonding member 30a has such a predetermined viscosity, the bonding member 30a may include a viscid member.

The flexible display panel 10 includes a flexible substrate (not shown) such as a plastic film, and displays an image by an organic light emitting diode and a pixel circuit on the flexible substrate. The organic light emitting diode OLED (see FIG. 10 and FIG. 11) and the pixel circuit may be covered by a thin film encapsulation layer. The thin film encapsulation layer suppresses characteristic deterioration by sealing the organic light emitting diode OLED from an external environment that contains moisture and oxygen.

A transparent cover window (not shown) may be provided in an external side of a display side of the flexible display panel 10. The cover window protects the flexible display panel 10 from an external impact or damage such as a scratch while an image of the flexible display panel 10 is visible therethrough at a display side thereof. In addition, a touch screen panel (not shown) that senses touch operation of a user may be provided between the flexible display panel 10 and the cover window.

The flexible display panel 10, the touch screen panel and the cover window collectively form a display module. In the drawings, the flexible display panel 10 in the first exemplary embodiment may be used to indicate the collective display module detailed above. A detailed structure of the flexible display panel 10 will be described later.

The case 20 is provided at the opposite side of the display side of the flexible display panel 10, and maintains the flexible display panel 10 in the constant shape by supporting the same. That is, when the foldable display device 100 is unfolded, the case 20 maintains the flexible display panel 10 in a substantially flat state, and when the foldable display device 100 is folded or bent, the case 20 maintains the flexible display panel 10 maintained in a folded or bent state.

The case 20 includes a hinge portion 21, and a pair of supports 22 respectively provided at opposing sides of the hinge portion 21 and coupled to the hinge portion 21. One side of the supports 22 facing toward the flexible display panel 10 provides a flat surface, and the pair of supports 22 rotates with respect to the hinge portion 21 such that the foldable display device 100 is foldable and unfoldable about pivot axes at the hinge portion 22.

The hinge portion 21 may include a uniaxial hinge structure or a biaxial hinge structure. The uniaxial hinge structure includes a single rotation shaft, and the pair of supports 22 are each rotated by being coupled to the single rotation shaft. The biaxial hinge structure includes two rotation shafts, and the pair of supports 22 are respectively rotated by being coupled to respective rotation shafts. A rotation shaft may define a rotation axis about which the supports 22 pivot. FIG. 1 and FIG. 2 exemplarily illustrate the biaxial hinge structure, but the invention is not limited thereto.

The flexible display panel 10 includes a bendable area 11 corresponding to and overlapping the hinge portion 21 of the case 20, and a pair of plane (otherwise referred to as planar) areas 12 located at opposing sides of the bent area 11 and respectively corresponding to and overlapping the supports 22 of the case 20. The bendable area 11 has a substantially planar surface when the flexible display panel 10 is unfolded and the pair of supports 22 in parallel (e.g., on substantially a same plane), and has an arc shape when the pair of supports 22 are pivoted to bend the flexible display panel 10 into a folded state. The bendable area 11 is not attached to the hinge portion 21, and the plane area 12 is partially or wholly attached to the supports 22 by the bonding member 30a. The bendable area 11 may be spaced apart from the case 20, but the invention is not limited thereto.

The bonding member 30a may include an acryl-based resin or a silicon-based resin, and may be located corresponding to an entire surface of the plane area 12 or located corresponding to a part of the plane area 12. When the bonding member 30a is located corresponding to the part of the plane area 12, one edge of the bonding member 30a matches (e.g., is aligned) with an external edge of the plane area 12 and the opposite edge of the bonding member 30a is located at a predetermined distance from the hinge portion 21 or the bendable area 11. FIG. 1 exemplarily illustrates that the bonding member 30a is provided corresponding to a part of the plane area 12, but the invention is not limited thereto.

A direct binding force to the support 22 is not generated in the bendable area 11 which is not attached to the support 22 or a part of the plane area 12 adjacent to and/or including the bendable area 11 of the flexible display panel 10.

In addition, a part of the bonding member 30a (e.g., a second bonding member portion 32 in the following description) has a displacement with respect to the support 22 along a cross-sectional thickness direction (e.g., a vertical direction with reference to FIG. 2) of the flexible display panel 10. Here the part of the bonding member 30a having the displacement with respect to the support 22 means that the bonding member 30a is moveable along the cross-sectional thickness direction such that the bonding member 30a partially moves along the cross-sectional thickness direction of the flexible display panel 10.

In the foldable display device 100 illustrated in FIG. 1 and FIG. 2, the collective bonding member 30a includes more than one portion, such as, a first and second bonding member portions 31 and 32, respectively having different displacement properties and bonding forces with respect to the supports 22. In further detail, the collective bonding member 30a includes the first bonding member portion 31 distanced further from the hinge portion 21 than the second bonding member portion 32, and the second bonding member portion 32 located in an inner side of the first bonding member portion 31 facing the hinge portion 21. A bonding force of the second bonding member portion 32 is lower than a bonding force of the first bonding member portion 31, with respect to the supports 22 and/or the hinge portion 21. In an unfolded state, the first and second bonding members 31 and 32 are in a same plane and/or a same layer of the foldable display apparatus 100.

Figure 3:
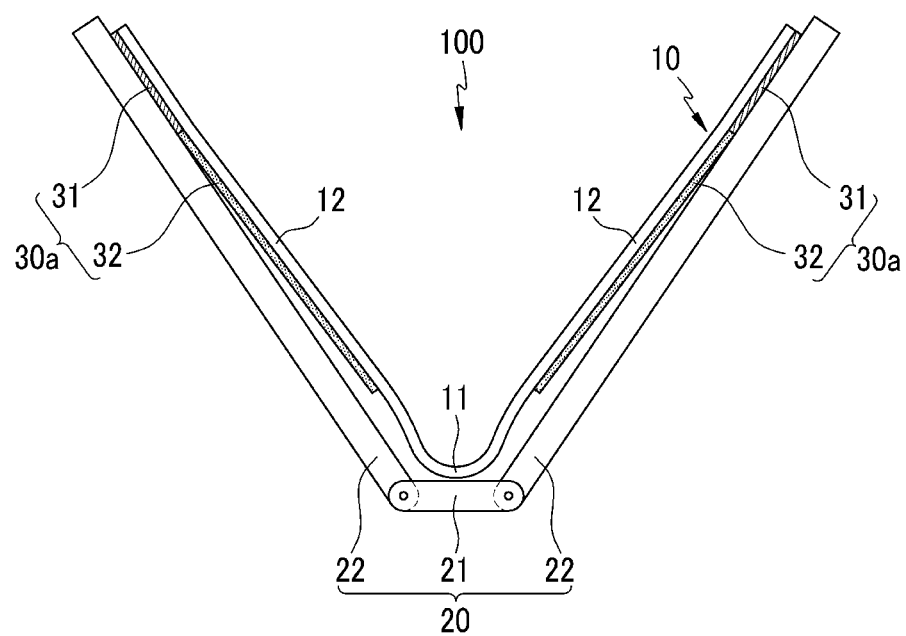
FIG. 3 and FIG. 4 are cross-sectional views of the foldable display device of FIG. 2 in bent states, respectively.
Figure 4:
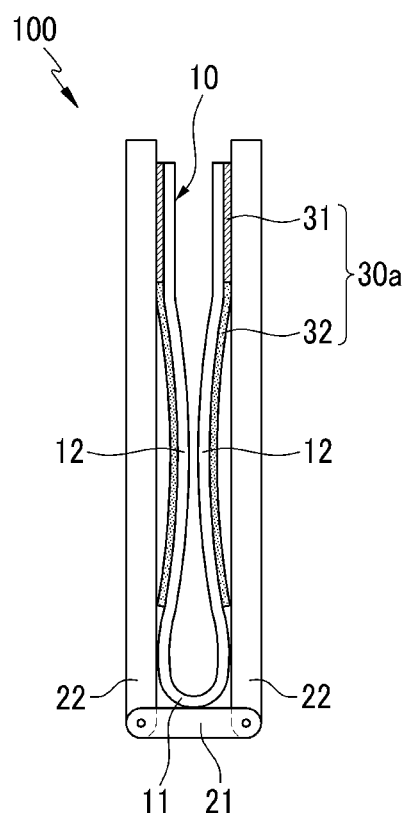

FIG. 3 and FIG. 4 are cross-sectional views illustrating the foldable display device of FIG. 2 in bent states, respectively.

Referring to FIG. 2 to FIG. 4, when the display device 100 is folded, the inner side of the bendable area 11 contracts due to pressure and the external side of the bendable area 11 is extended due to tension. Due to such a contraction and extension, a stress, that is, a bending stress is generated in the flexible display panel 10. The stress of the flexible display panel 10 is maximized in the bendable area 11 and is decreased in a distance further from the bendable area 11.

A bonding force of the second bonding member portion 32 with respect to the supports 22 and/or the hinge portion 21 is set low enough to be overcome by external force such as a bending stress generated in the flexible display panel 10. That is, when the flexible display panel 10 is folded by rotating the pair of supports 22 at the hinge portion 21, a tension force is generated in the external side of the bendable area 11 and the plane area 12, and the bonding force of the second bonding member portion 32 with respect to the hinge portion 21 is exceeded due to the tension force and the second bonding portion 32 is separated from the support 22. The first bonding member portion 31 may remain in contact with the support 22 when the flexible display panel 10 is bent, but the invention is not limited thereto.

Thus, as shown in FIG. 3 and FIG. 4, when the flexible display panel 10 is bent, the center portion of the flexible display panel 10 receiving a relatively large tension force is separated from the case 20 so that the bending stress is released. That is, since the center portion of the flexible display panel 10, receiving large tension force is not restricted by the case 20, the bending stress can be released.

When the flexible display panel 10 is unfolded, the second bonding member portion 32 returns to an original position and contacts the support 22, such that a bonding force between the second bonding member portion 32 and the case is restored by a pressure applied thereto when the flexible display panel 10 is unfolded. In one exemplary embodiment, for the bonding force between the second bonding member portion 32 and the case 20 to be restored, the second bonding member portion 32 may include a pressure sensitive adhesive ("PSA") which is attachable or separable (e.g., detached) from an element by a relatively low pressure or force.

The bonding force of the second bonding member portion 32 may be in a range from about 10 gram-force per centimeter (gf/cm) to 1,500 gf/cm. When the bonding force of the second bonding member portion 32 is less than about 10 gf/cm, the second bonding member portion 32 may be too easily separated from the support 22 under a relatively small external force so that flexible display panel 10 cannot be stably bonded to the case 20. When the bonding force of the second bonding member portion 32 is higher than about 1,500 gf/cm, the second bonding member portion 32 is not easily separated from the support 22 when the foldable display device 10 is being folded so that the bending stress is maintained (e.g., not relieved) in the flexible display panel 10.

In contrast, the first bonding member portion 31 not separated by an external force applied thereto, even by a strong bonding force, when the foldable display device 100 is folded or unfolded, and thus the edge of the flexible display panel 10 is fixed to the support 22 by the first bonding member portion 31.

As described, an exemplary embodiment of the foldable display device 100 according to the invention has a structure in which a bonding area of the flexible display panel 10 with respect to the case 20 is variable due to the bonding member 30a. That is, only the edge of the flexible display panel 10 is fixed to the case 20, and other portions of the flexible display panel 10 are selectively attached to or detached from the case 20. Therefore, the exemplary embodiment of the foldable display device 100 illustrated in FIG. 1 to FIG. 4 can reduce or effectively prevent damage to the flexible display panel 10 by releasing a stress generated in the foldable display device 100, and improves durability.

A planar area of the second bonding member portion 32 is larger than a planar area of the first bonding member portion 31. In one exemplary embodiment, for example, the planar area of the second bonding member portion 32 may be more than two times the planar area of the first bonding member portion 31. Where the planar area of the second bonding member portion 32 is larger than the planar area of the first bonding member portion 31, the detachable area of the flexible display panel 10 is increased to effectively reduce the bending stress of the flexible display panel 10.

Figure 5:
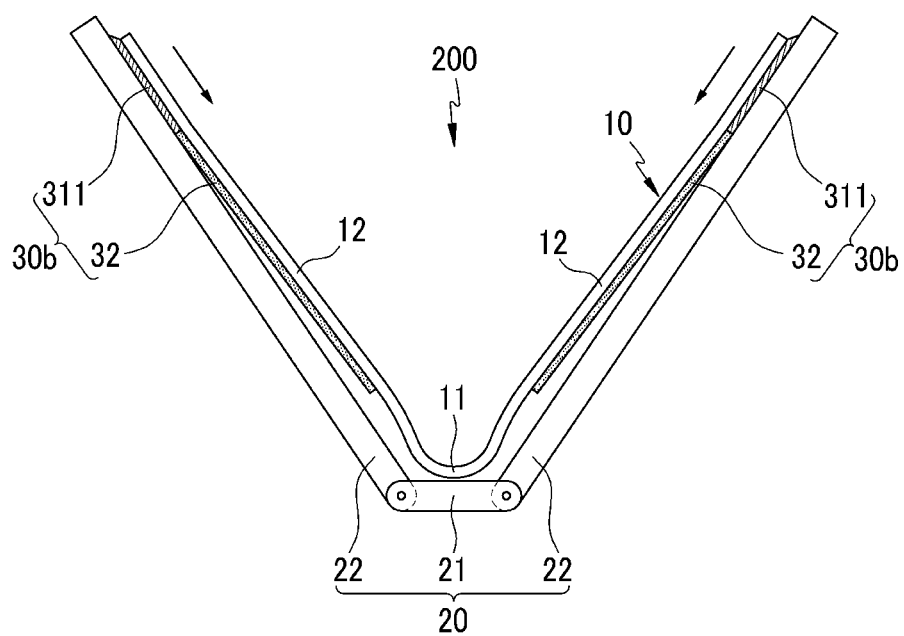
FIG. 5 is a cross-sectional view of another exemplary embodiment of a foldable display device according to the invention.
Figure 6:
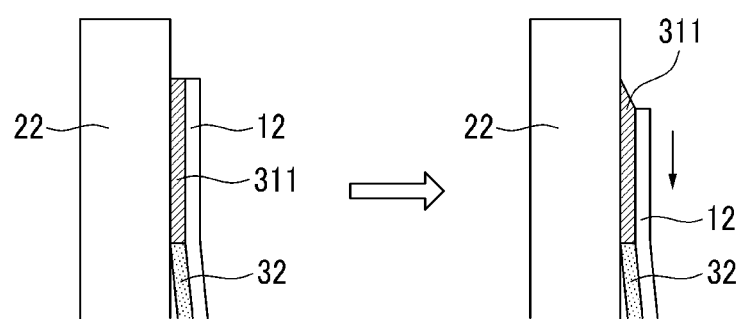
FIG. 6 is a partially enlarged view of the foldable display device of FIG. 5.

FIG. 5 is a cross-sectional view of another exemplary embodiment of a foldable display device according to the invention, and FIG. 6 is a partially enlarged view of the foldable display device of FIG. 5.

Referring to FIG. 5 and FIG. 6, a foldable display device 200 is substantially the same as the foldable display device of FIG. 1 to FIG. 4, except that a first bonding member portion 311 of a bonding member 30b has a displacement with respect to a pair of supports 22 along a plane direction of a flexible display panel 10. The same reference numerals are used for the same components as those of the exemplary embodiment of FIG. 1 to FIG. 4, and constituent elements that are different from the exemplary embodiment of FIG. 1 to FIG. 4 will be described.

In the foldable display device 200, the first bonding member portion 311 has a displacement with respect to the support 22 along a plane direction (e.g., a vertical direction in FIG. 6 and indicated by the downward pointing arrow) of the flexible display panel 10, and a second bonding member portion 32 has a displacement with respect to the support 22 along a thickness direction (e.g., a horizontal direction in FIG. 6) of the flexible display panel 10. The configuration and operation of the second bonding member portion 32 are the same as those previously described, and therefore no further description will be provided.

The first bonding member portion 311 has an elongation characteristic such that the first bonding member portion 311 is extendable by an external force. In one exemplary embodiment, the first bonding member portion 311 includes a highly stretchable or elastic adhesive having a high elongation ratio. In the foldable display device 200, an external force is applied to the first bonding member portion 311 along a plane direction of the flexible display panel 10 when the foldable display device 200 is bent. In folding the foldable display device 200, the first bonding member portion 311 is elongated along the plane direction of the flexible display panel 10 and thus has a displacement with respect to the support 22.

The first bonding member portion 311 stably fixes the edge of the flexible display panel 10 to the case 20, and at the same time, is deformable to be elongated by a tension force generated when the flexible display panel 10 is folded, and thus the edge of the flexible display panel 10 slides or is translated with respect to the case.

In further detail, when the foldable display device 200 is folded, a tension force is generated in external sides of a bendable area 11 and a plane area 12, and a bonding force of the second bonding member portion 32 with respect to the support is exceeded due to the tension force and the second bonding member portion 32 is separated from the support 22. By such an action of the second bonding member portion 32, a bending stress of the flexible display panel 10 can be primarily reduced.

Then, the first bonding member portion 311 is elongated along the plane direction of the flexible display panel 10 by the tension force applied to the edge of the flexible display panel 10 and thus the edge of the flexible display panel 10 slides toward a hinge portion 21. By such an action of the first bonding member portion 311, the bending stress of the flexible display panel 10 can be secondarily reduced.

The second bonding member portion 32 is detachable from the case 20. In contrast, the first bonding member portion 311 remains attached (e.g., is not detachable) from the case 20 and moves the location of the edge of the flexible display panel 10 by being elongated by an external force.

The first bonding member portion 311 may include a material such as an adhesive having an elongation ratio of about 100% to about 1,000%. Since two (e.g., opposing) surfaces of the first bonding member portion 311 are respectively attached to the support 22 and the plane area 12, a sliding effect can be acquired by using an adhesive having a relatively high elongation ratio. When the elongation ratio of the adhesive is less than about 100%, the sliding of the flexible display panel 100 cannot be smoothly provided, and when the elongation ratio of the adhesive exceeds about 1,000%, wrinkles may be generated in the edge of the flexible display panel 10 when the foldable display device 200 is folded and unfolded.

Figure 7:
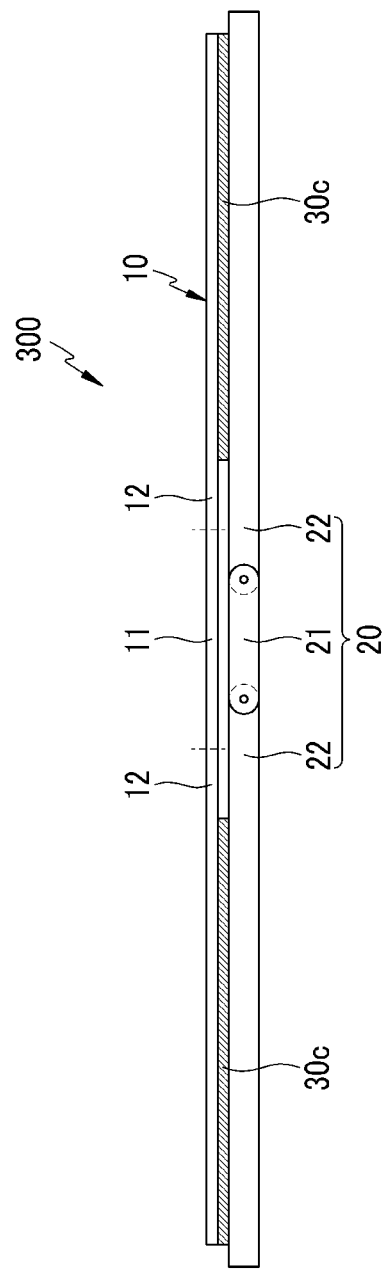
FIG. 7 and FIG. 8 are cross-sectional views of still another exemplary embodiment of a foldable display device in an un-folded and a bent state, respectively, according to the invention.
Figure 8:
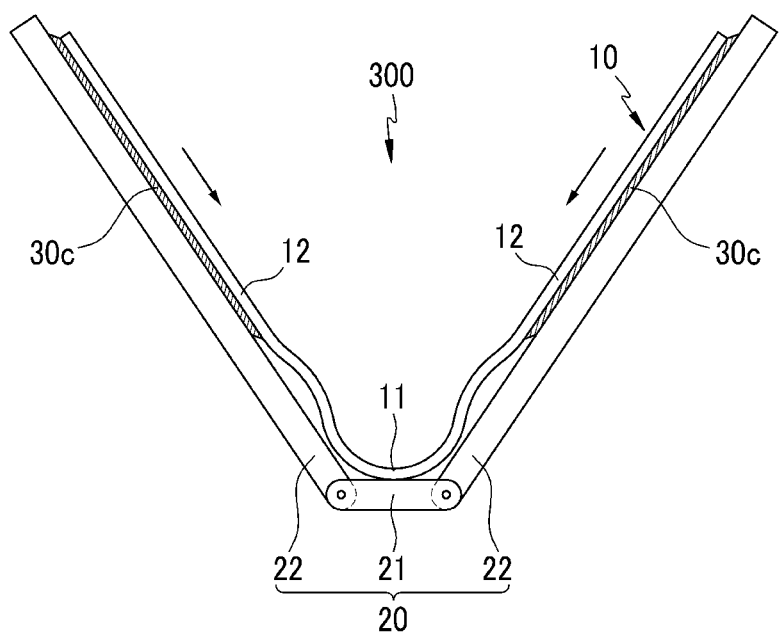

FIG. 7 and FIG. 8 are cross-sectional views of still another exemplary embodiment of a foldable display device in an un-folded and a bent state, respectively, according to the invention.

Referring to FIG. 7 and FIG. 8, a foldable display device 300 is substantially the same as the foldable display device of FIG. 5 and FIG. 6, except that a bonding member 30c wholly has a displacement with respect to a support 22 along a plane direction of a flexible display panel 10. The same reference numerals are used for the same components as those of the exemplary embodiment of FIG. 5 and FIG. 6, and constituent elements that are different from the exemplary embodiment of FIG. 5 and FIG. 6 will be described.

In the foldable display device 300, the bonding member 30c is a single, unitary, indivisible member, and has a displacement with respect to the support 22 along the plane direction of the flexible display panel 10 (e.g., a horizontal direction in FIG. 7)

That is, the foldable display device 300 of FIG. 7 and FIG. 8 has a structure in which the second bonding member portion of the exemplary embodiment of FIG. 5 and FIG. 6 is omitted and the first bonding member portion is extended to a location of the second bonding member portion.

The bonding member 30c stably fixes the flexible display panel 10 to the case 20, and at the same time is elongated by a tension force generated when the flexible display panel 10 is folded. Due to the tension force, a part of the flexible display panel 10 contacting the bonding member 30c is slidable with respect to the case 20.

In further detail, when the flexible display panel 10 is folded, a tension force is generated in external sides of the bendable area 11 and the plane are 12, and the bonding member 30c is elongated along the plane direction of the flexible display panel 10 by the tension force so that the flexible display panel 10 is partially slid toward the hinge portion 21. The foldable display device 300 can reduce a bending stress generated in the flexible display panel 10 by such an action of the bonding member 30c.

The bonding member 30c may include a material such as an adhesive having an elongation ratio of about 100% to about 1,000%. Since two (e.g., opposing) surfaces of the bonding member 30c are respectively attached to the support 22 and the plane area 12, the above-stated sliding effect can be acquired by using an adhesive having a high elongation ratio. The foldable display device 300 of FIG. 7 and FIG. 8 uses one type of adhesive and therefore a manufacturing process can be simplified. However, in an alternative exemplary embodiment, the bonding member 30c may include more than one type of adhesive FIG. 9 is a graph illustrating a luminance characteristic (percent: %) according to the number of times of bending an exemplary embodiment of a foldable display device according to the invention and a foldable display device of a comparative embodiment.

Figure 9:
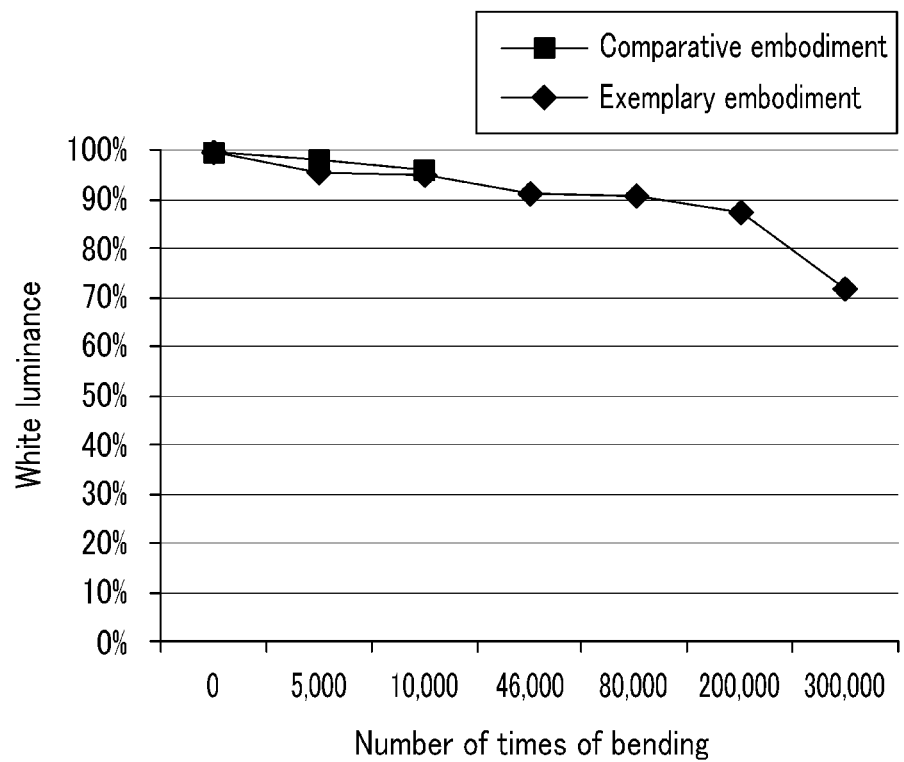
FIG. 9 is a graph illustrating a luminance characteristic (percent: %) according to the number of times of bending an exemplary embodiment of a foldable display device according to the invention and a foldable display device of a comparative embodiment.

The Exemplary embodiment in FIG. 9 represents the foldable display device illustrated in FIG. 1 to FIG. 4. The foldable display device of the Comparative embodiment is different from that of FIG. 1 to FIG. 4, in that the Comparative embodiment has a structure in which the second bonding member portion in the foldable display device of FIG. 1 to FIG. 4 is omitted and a first bonding member portion is extended to a location of the second bonding member portion. Other constituent elements for the bonding member are the same in the foldable display device of the Exemplary embodiment and the foldable display device of the Comparative embodiment.

Referring to FIG. 9, in the foldable display device of the Comparative embodiment (--■--), a flexible display panel and an optical transparent adhesive layer were separated when the number of times of bending was approximately 11,500, and a life-span thereof that was ended before the number of times of bending reaches 20,000. In contrast, the foldable display device of the Exemplary embodiment (--♦--) had negligible change when the number of times of bending was more than 200,000.

Figure 10:
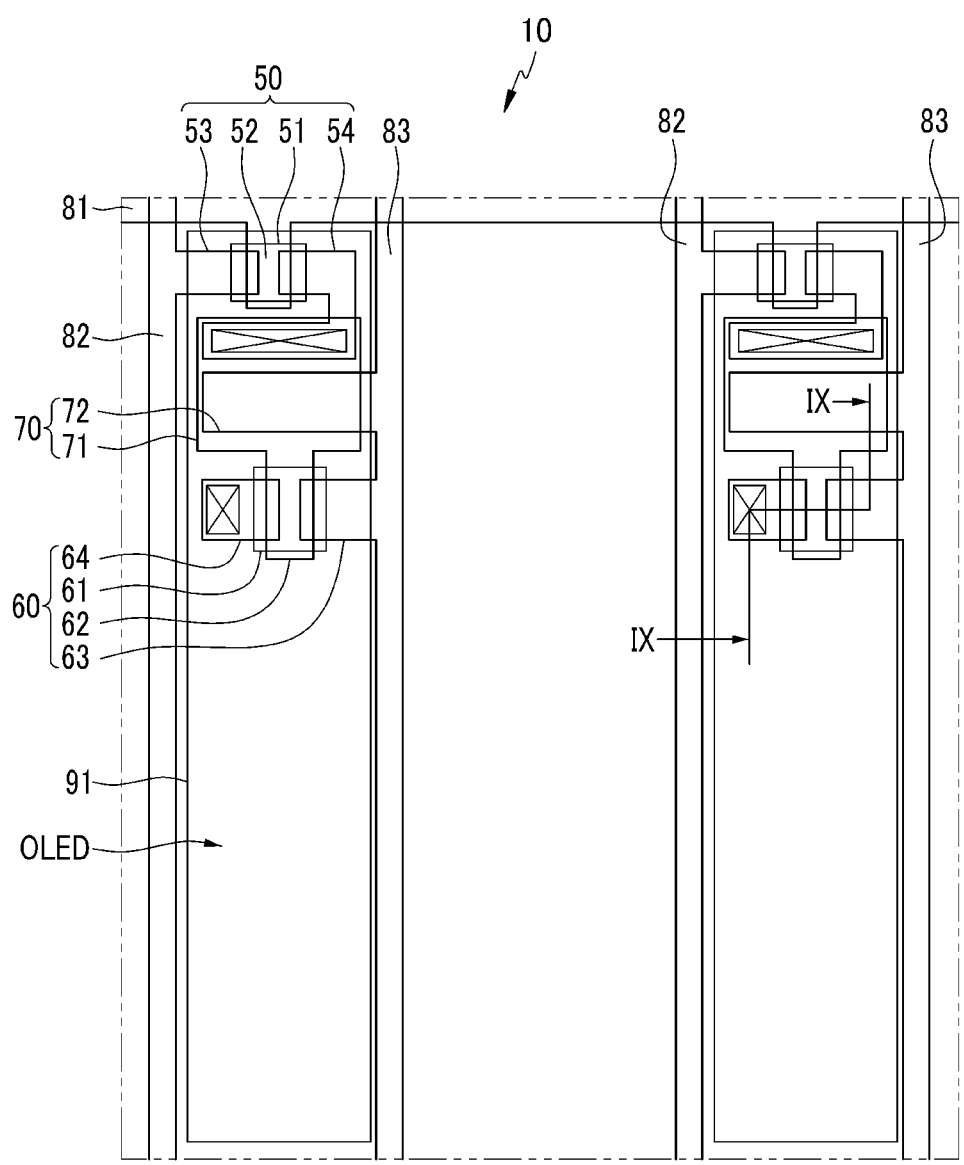
FIG. 10 is a plan view of an exemplary embodiment of a pixel structure of the flexible display panel of FIG. 1.

FIG. 10 shows a plan view of an exemplary embodiment of a pixel structure of the flexible display panel of FIG. 1, and FIG. 11 is a cross-sectional view taken along line IX-IX in FIG. 10. The flexible display panel is not limited to a structure that will be hereinafter described, and may include an organic light emitting diode display or liquid crystal display having a different structure.

The flexible display panel 10 may include a plurality of pixels defined therein. Referring to FIG. 10 and FIG. 11, the flexible display panel 10 includes a pixel circuit DC and an organic light emitting diode OLED disposed in each pixel. The pixel circuit DC basically includes a switching thin film transistor 50, a driving thin film transistor 60 and a capacitor 70. In addition, the flexible display panel 10 includes gate lines 81 elongated in a first direction, and arranged along a second direction different than the first direction. Data lines 82 and common power lines 83 of the flexible display panel 10 may be elongated in the second direction and cross the gate lines 81, while being arranged in the first direction, but the invention is not limited thereto. The gate lines 91 are insulated from the data lines 83.

In one exemplary embodiment, one pixel may be defined by a boundary of the gate line 81, the data line 82 and the common power line 83, but the invention is not limited thereto. The term pixel means a basic unit that displays an image. The flexible display panel 10 displays an image through the plurality of pixels.

In FIG. 10, one pixel of an active matrix flexible display panel 10 may include a two thin film transistor-one capacitor ("2Tr-1Cap") structure. In this structure, two thin film transistors 50 and 60 and one capacitor 70 are provided in the one pixel. However, the structure of the flexible display panel 10 is not limited to the illustrated exemplary embodiment. The flexible display panel 10 may include three or more thin film transistors and two or more capacitors in a pixel. An additional wire may be further disposed in the flexible display panel 10 so that the flexible display panel 10 may have various structures.

The organic light emitting diode OLED includes a pixel electrode 91, an organic emission layer 92 and a common electrode 93. One of the pixel electrode 91 and the common electrode 93 may be a hole injection electrode and the other may be an electron injection electrode. Light is emitted when electrons and holes are injected from the pixel electrode 91 and the common electrode 93 into the organic emission layer 92, and excitons in which the holes and the electrons are combined with each other is reduced from an exited state to a base state.

The pixel electrode 91 may include a metal having high reflectance and the common electrode 93 may include a transparent conductive material layer. Where the pixel electrode 91 includes a reflective material and the common electrode 93 includes a transparent material, the light of the organic emission layer 92 is reflected by the pixel electrode 91 and transmitted through the common electrode 93 and an encapsulation substrate 45, so as to be emitted to outside the flexible display panel 10. In FIG. 11, the reference numeral 40 denotes a flexible substrate.

The capacitor 70 includes a pair of capacitor electrodes 71 and 72 disposed overlapping each other, and an interlayer insulating layer 85 is interposed therebetween. Here, the interlayer insulating layer 85 is a dielectric material. Charges charged in the capacitor 70, and a voltage between the two capacitor electrodes 71 and 72 determine capacitance.

The switching thin film transistor 50 includes a switching semiconductor layer 51, a switching gate electrode 52, a switching source electrode 53 and a switching drain electrode 54. The driving thin film transistor 60 includes a driving semiconductor layer 61, a driving gate electrode 62, a driving source electrode 63 and a driving drain electrode 64.

The switching thin film transistor 50 is used as a switch that selects a pixel for light emission. The switching gate electrode 52 is connected to a gate line 81 among the gate lines 81. The switching source electrode 53 is connected to a data line 82 among the data line 82, and the switching drain electrode 54 is connected to one electrode 71 among the capacitor electrodes 71 and 72.

The driving thin film transistor 60 applies driving power to the pixel electrode 91 for light emission of an organic emission layer 92 of the selected pixel. The driving gate electrode 62 is connected with the capacitor electrode 71 that is connected with the switching drain electrode 54. The driving source electrode 63 and the other capacitor electrode 72 are connected with the common power line 83. The driving drain electrode 64 is connected with the pixel electrode 91 of the organic light emitting diode OLED through a contact hole defined in a layer between the driving drain electrode 64 and the pixel electrode 91.

The switching thin film transistor 50 is driven by a gate voltage applied to the gate line 81 and transmits a data voltage applied to the data line 82 to the driving thin film transistor 60. A voltage corresponds to a difference between a common voltage applied to the driving thin film transistor 60 from the common power line 83 and the data voltage transmitted from the switching thin film transistor 50 and is stored in the capacitor 70, and a current corresponding to the voltage stored in the capacitor 70 flows to the organic light emitting diode OLED through the driving thin film transistor 60 and thus the organic emission layer 92 emits light.

The thin film encapsulation layer 45 may include a structure in which at least one organic layer and at least one inorganic layer are alternately layered. The organic layer of the thin film encapsulating layer 45 may include polymer, and may be a monolayer, or a multi-layer including, for example, polyethylene terephthalate, polyimide, polycarbonate, epoxy, polyethylene, polyacrylate or a combination thereof. The inorganic layer of the thin film encapsulating layer 45 may be a monolayer or a multi-layer containing a metal oxide and/or a metal nitride. In one exemplary embodiment, for example, the inorganic layer may include silicon nitride (SiNx), Al2O3, SiO2, TiO2 or a combination thereof. The uppermost layer of the thin film encapsulation layer 45, exposed to the external environment, may include an inorganic layer so as to prevent permeation of moisture and/or oxygen into the organic light emitting diode OLED.

According to one or more exemplary embodiments, a bending stress generated when the flexible display panel is folded can be released by using a bonding member. Thus, a stress generated in the flexible display panel can be released, and accordingly, damage to the flexible display panel can be reduced or effectively prevented and durability thereof can be improved.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A foldable display device comprising:
  a case comprising:
    a hinge portion, and
    supports respectively coupled to the hinge portion at opposing sides of the hinge portion;
  a flexible display panel comprising:
    a bendable area corresponding to the hinge portion of the case, and
    planar areas respectively at opposing sides of the bendable area and corresponding to the supports of the case; and
  a bonding member respectively between each support of the case and the corresponding planar area in a thickness direction of the flexible display panel in an unfolded state thereof, the bonding member defining a bonding area with respect to the support,
  wherein when the flexible display panel is folded, the bonding member is displaceable with respect to the support along one direction among the thickness direction and a plane direction of the flexible display panel, and the bonding area defined by the bonding member is variable according to a folded state or the unfolded state of the flexible display panel.

2. The foldable display device of claim 1, wherein the bonding member comprises:
  a first bonding member portion, and
  a second bonding member portion which is displaceable with respect to the support along the thickness direction of the flexible display panel when the flexible display panel is folded.

3. The foldable display device of claim 2, wherein the second bonding portion member is disposed closer to the hinge portion of the case than the first bonding member portion, and has a bonding force with respect to the support less than that of the first bonding member portion.

4. The foldable display device of claim 3, wherein
  the bonding force of the second bonding member portion with respect to the support is exceeded by an external force applied when the flexible display panel is folded, such that the second bonding member portion is separated from the support along the thickness direction of the flexible display panel when the flexible display panel is folded, and
  the bonding force of the second bonding member portion with respect to the support is restored when the flexible display panel is unfolded.

5. The foldable display device of claim 4, wherein
  the second bonding member portion comprises a pressure sensitive adhesive, and
  the bonding force of the second bonding member portion with respect to the support is in a range from about 10 gf/cm to about 1,500 gf/cm.

6. The foldable display device of claim 3, wherein the first bonding member portion comprises an adhesive having an elongation characteristic, and is displaceable with respect to the support along the plane direction of the flexible display panel when the flexible display panel is folded.

7. The foldable display device of claim 6, wherein
  the first bonding member portion comprises an adhesive, and
  an elongation ratio of the first bonding member portion is in a range from about 100% to about 1,000%.

8. The foldable display device of claim 3, wherein
  a first edge of the first bonding member portion corresponds to an external edge of the corresponding planar area, and
  an area of the second bonding member portion is larger than an area of the first bonding member portion.

9. The foldable display device of claim 1, wherein the bonding member comprises an adhesive having an elongation characteristic, and is displaceable with respect to the support along the plane direction of the flexible display panel when the flexible display panel is folded.

10. The foldable display device of claim 9, wherein
  the bonding member comprises an adhesive, and
  an elongation ratio of the bonding member is in a range from about 100% to about 1,000%.

11. A foldable display device comprising:
  a case comprising:
    a hinge portion, and
    supports respectively coupled to the hinge portion at opposing sides of the hinge portion;

a flexible display panel comprising:
  a bendable area corresponding to the hinge portion of the case, and
  planar areas respectively at opposing sides of the bendable area and corresponding to the supports of the case; and
a bonding member respectively between each support of the case and the corresponding planar area in a thickness direction of the flexible display panel in an unfolded state thereof, the bonding member defining a bonding area with respect to the support, wherein the bonding area defined by the bonding member is variable according to a folded state or the unfolded state of the flexible display panel.

12. The foldable display device of claim 11, wherein the bonding member comprises two different adhesives.

13. The foldable display device of claim 12, wherein the bonding member comprises:
  a first bonding member portion, and
  a second bonding member portion closer to the hinge portion of the case than the first bonding member portion, and is detachable from the support according to a folded state or unfolded state of the flexible display panel.

14. The foldable display device of claim 13, wherein
  the second bonding member portion comprises a pressure sensitive adhesive, and
  a bonding force of the second bonding member portion with respect to the support is in a range from about 10 gf/cm to about 1,500 gf/cm.

15. The foldable display device of claim 13, wherein
  an area of the second bonding member portion is more than two times an area of the first bonding member portion.

* * * * *